(12) United States Patent
Inoue (10) Patent No.: US 6,223,297 B1
(45) Date of Patent: Apr. 24, 2001

(54) CLOCK MODIFYING METHOD AND INFORMATION PROCESSING APPARATUS WHICH GRADUALLY INCREASE FREQUENCY OF AN EXTERNAL CLOCK TO BE SUPPLIED TO PROCESSING UNIT

(75) Inventor: Naoyuki Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/063,014

(22) Filed: Apr. 21, 1998

(30) Foreign Application Priority Data

Nov. 10, 1997 (JP) ...................................... 9-306907

(51) Int. Cl.[7] ................. G06F 1/08; G06F 1/32
(52) U.S. Cl. ............................ 713/501; 713/322
(58) Field of Search ...................... 713/322, 500, 713/501

(56) References Cited

U.S. PATENT DOCUMENTS

| | | | |
|---|---|---|---|
| 4,893,271 | * 1/1990 | Davis et al. | 713/501 |
| 5,265,081 | 11/1993 | Shimizume et al. | |
| 5,663,687 | 9/1997 | Kozu. | |
| 5,768,602 | * 6/1998 | Dhuey | 713/322 |
| 5,822,596 | * 10/1998 | Casal et al. | 713/322 |
| 5,825,674 | 10/1998 | Jackson. | |
| 6,000,035 | * 12/1999 | Matsushima et al. | 713/322 X |

FOREIGN PATENT DOCUMENTS

| | | |
|---|---|---|
| 0 770 952 | 5/1997 | (EP). |
| 4-47738 | 2/1992 | (JP). |
| 7-287699 | 10/1995 | (JP). |
| 9-128092 | 5/1997 | (JP). |

OTHER PUBLICATIONS

"Power Management Clock Change for 603 Processor", IBM Technical Disclosure Bulletin, vol. 38, No. 12, Dec. 1, 1995, pp. 325–327.

* cited by examiner

Primary Examiner—Thomas M. Heckler
(74) Attorney, Agent, or Firm—Staas & Halsey LLP (57) ABSTRACT

An information processing apparatus is constructed so that a frequency of an external clock to be supplied to a central processing unit (CPU) which includes a phase locked loop (PLL) circuit is gradually increased from a first frequency to a second frequency within a latency time required for the PLL circuit to make a phase lock, when an operation mode of the CPU is switched from a first mode to a second mode.

16 Claims, 7 Drawing Sheets

CLOCK MODIFYING METHOD AND INFORMATION PROCESSING APPARATUS WHICH GRADUALLY INCREASE FREQUENCY OF AN EXTERNAL CLOCK TO BE SUPPLIED TO PROCESSING UNIT

BACKGROUND OF THE INVENTION

The present invention generally relates to clock supplying methods and information processing apparatuses, and more particularly to a clock supplying method for supplying a clock to a central processing unit (CPU) which has operation modes operating with clocks of different frequencies, and to an information processing apparatus which employs such a clock supplying method.

Recently, due to improved operation speeds of CPUs, the performance of information processing apparatuses such as personal computer using the CPU has improved considerably. However, as the operation speed of the CPU increases, the power consumption of the CPU also increases. Hence, particularly with respect to the CPU which is used in a portable information processing apparatus which uses a battery as a power source, there are two conflicting demands to be satisfied, namely, to increase the operation speed of the CPU and to reduce the power consumption of the CPU.

In the portable information processing apparatus such as a lap-top computer, the battery is used as the power source when the portable information processing apparatus is carried by the user, and it is desirable to minimize the power consumption so as to extend the serviceable life of the battery. Conventionally, in order to reduce the power consumption of the CPU, a proposed method operates the CPU at a high speed in a state where an amount of information to be processed by the CPU is large and at a low speed in a state where the amount of information to be processed by the CPU is small. More particularly, a clock supplied to the CPU is set to a high frequency when the amount of information to be processed by the CPU is large, and the clock supplied to the CPU is set to a low frequency or the supply of the clock to the CPU is stopped when the amount of information to be processed by the CPU is small.

Such a method of controlling the supply of the clock to the CPU is effective in reducing the power consumption of the information processing apparatus such as the personal computer which uses the CPU.

However, when controlling the supply of the clock to the CPU in the above described manner, the higher a maximum frequency of the clock and the higher the power consumption of the CPU, the larger a change in a current supplied to the CPU becomes when the frequency of the clock is switched from a state where the clock has a low frequency or the supply of the clock to the CPU is stopped to a state where the clock has the maximum frequency. For this reason, in order to suppress a sudden voltage drop within the CPU due to such a change in the current supplied to the CPU, a plurality of capacitors are usually provided in a power supply module of the CPU, so as to absorb the sudden voltage drop. In the case of the high-performance CPU which has recently become available, the capacitances of these capacitors are on the order of 1000 $\mu$F to 2000 $\mu$F, for example, and are extremely large.

As described above, the capacitances of the capacitors provided in the power supply module have increased due to the improved performance of the CPU. For example, in a case where a dropper type 3-terminal regulator is to supply the power supply voltage to the CPU which operates at a power supply voltage of n V, a voltage drop D described by the following formula occurs in the CPU, where C denotes a capacitance of the capacitor and R denotes a resistance in the CPU.

$$D = n \times (1 - \exp(-t/RC)) \text{ V}$$

For example, in the case of the CPU which is generally used in the personal computer, the voltage drop D must be suppressed to approximately 0.1 V to 0.2 V. Hence, in a case where the power supply voltage n is approximately 3 V, t is 1×10−5 sec by assuming that the regulator oscillates at 100 kHz, a maximum current consumption of the CPU is 6 A, and the resistance R is 0.5 Ω from (3 V)/(6 A), for example, it is necessary to set the capacitance C of the capacitor to 590 $\mu$F if the voltage drop D is to be suppressed to 0.1 V, and to set the capacitance C of the capacitor to 290 $\mu$F if the voltage drop D is to be suppressed to 0.2 V.

In the calculation described above, an equivalent series resistance (ESR) of the capacitors is assumed to be zero, and thus, the actual capacitance C of the capacitor must be set to a value which is approximately 20% to 30% larger than the above described value.

Accordingly, since it is necessary to provide the capacitors having the large capacitances in order to increase the operation speed of the CPU, there were problems in that the conventional information processing apparatus becomes expensive, and in addition, it was difficult to reduce the size of the information processing apparatus because a large area is required to mount these capacitors. On the other hand, if the above described capacitors are not provided, a large voltage drop is generated when, the operation speed is switched, the operation of the CPU becomes unstable, thereby making it difficult to increase the operation speed of the CPU.

SUMMARY OF THE INVENTION

Accordingly, it is a general object of the present invention to provide a novel and useful clock supplying method and information processing apparatus, in which the problems described above are eliminated.

Another and more specific object of the present invention is to provide a clock supplying method and an information processing apparatus which can satisfy two conflicting demands, namely, to increase the operation speed of the CPU and to reduce the power consumption of the CPU, by use of an inexpensive and simple structure which enables the size of the information processing apparatus to be reduced.

Still another object of the present invention is to provide a clock supplying method comprising the steps of gradually increasing a frequency of an external clock to be supplied to a central processing unit (CPU) which includes a phase locked loop (PLL) circuit from a first frequency to a second frequency within a latency time required for the PLL circuit to make a phase lock, when an operation mode of the CPU is switched from a first mode to a second mode. According to the clock supplying method of the present invention, it is possible to satisfy two conflicting demands, namely, to increase the operation speed of the CPU and to reduce the power consumption of the CPU, by use of an inexpensive and simple structure which enables the size of the information processing apparatus to be reduced.

In the clock supplying method, the first mode may be a power save mode of the CPU. In addition, an internal clock of the CPU may be stopped in the power save mode. In these cases, it is possible to effectively reduce the power consumption of the CPU.

The clock supplying method may further comprise the steps of gradually decreasing the frequency of the external clock to be supplied to the CPU from the second frequency to the first frequency, when the operation mode of the CPU is switched from the second mode to the first mode. In this case, it is possible to stabilize the operation of the CPU when the operation mode of the CPU is switched.

A further object of the present invention is to provide an information processing apparatus comprising a clock generator having a variable oscillation frequency and generating an external clock, and a central processing unit (CPU) having a phase locked loop (PLL) circuit and supplied with the external clock, where the clock generator gradually increases a frequency of the external clock from a first frequency to a second frequency within a latency time required for the PLL circuit to make a phase lock, when an operation mode of the CPU is switched from a first mode to a second mode in response to a mode instruction signal. According to the information processing apparatus of the present invention, it is possible to satisfy two conflicting demands, namely, to increase the operation speed of the CPU and to reduce the power consumption of the CPU, by use of an inexpensive and simple structure which enables the size of the information processing apparatus to be reduced.

In the information processing apparatus, the first mode may be a power save mode of the CPU. In addition, an internal clock of the CPU may be stopped in the power save mode. In these cases, it is possible to effectively reduce the power consumption of the CPU.

In the information processing apparatus, the clock generator may gradually decrease the frequency of the external clock to be supplied to the CPU from the second frequency to the first frequency, when the operation mode of the CPU is switched from the second mode to the first mode in response to the mode instruction signal. In this case, it is possible to stabilize the operation of the CPU when the operation mode of the CPU is switched.

Other objects and further features of the present invention may be apparent from the following detailed description when read in conjunction with the accompanying drawings.

DESCRIPTION OF THE PREFERRED EMBODIMENTS

Figure 1:
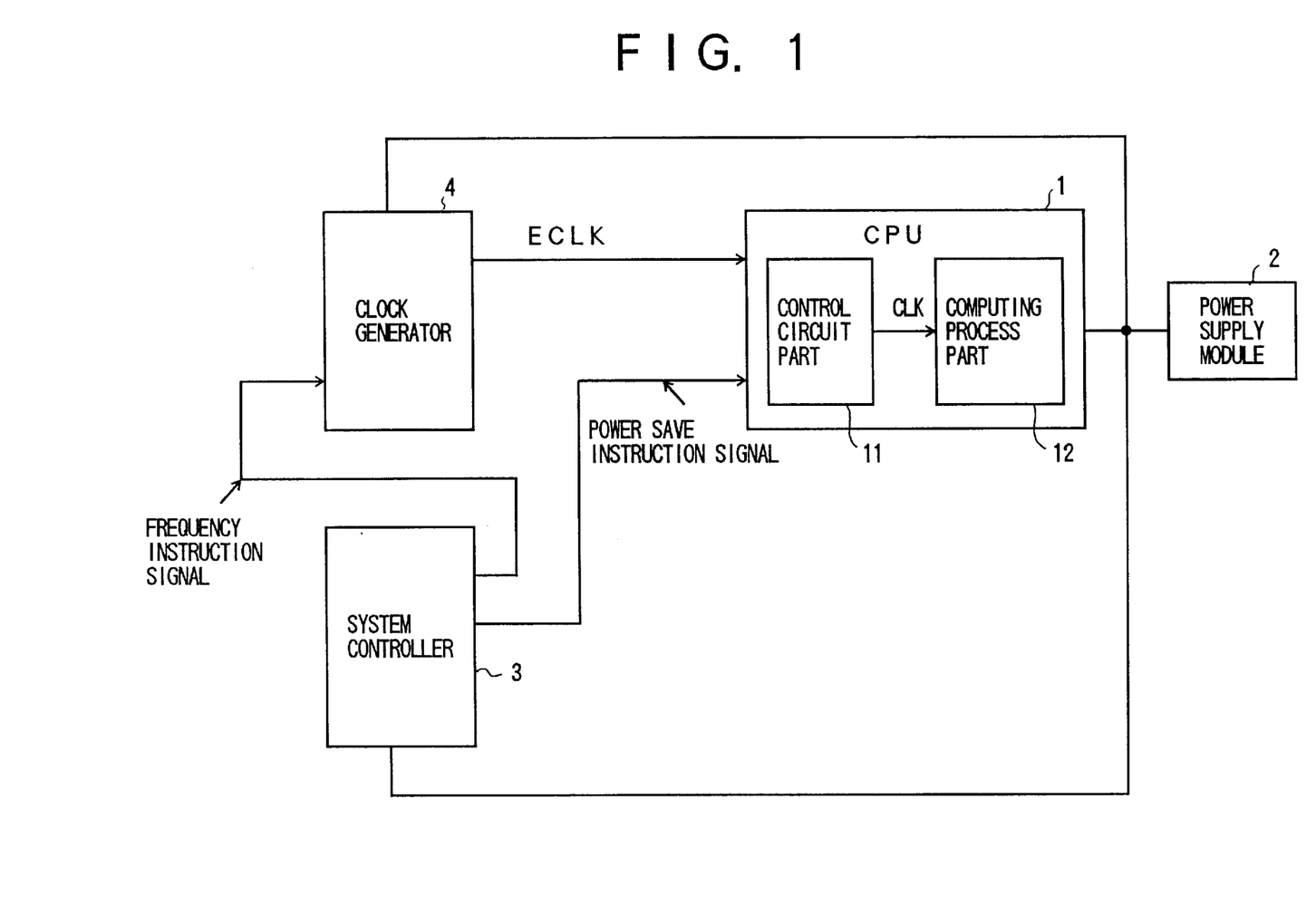
FIG. 1 is a system block diagram showing an important part of a first embodiment of an information processing apparatus according to the present invention.

FIG. 1 is a system block diagram showing an important part of a first embodiment of an information processing apparatus according to the present invention. This first embodiment of the information processing apparatus employs a first embodiment of a clock supplying method according to the present invention. In this first embodiment of the information processing apparatus, the present invention is applied to a lap-top computer.

In FIG. 1, a lap-top computer generally includes a CPU 1, a power supply module 2, a system controller 3, and a clock generator 4. The CPU 1 includes a control circuit part 11 which includes a PLL circuit and generates an internal clock CLK having a frequency higher than an external clock ECLK based on the external clock ECLK which is input, and a computing process part 12 which carries out various operations responsive to the internal clock CLK. In this embodiment, the control circuit part 11 has a function of stopping the internal clock CLK and stopping the operation within the CPU 1 in response to a power save instruction signal which instructs a power save mode which will be described later. For example, any of CPUs of the Intel Pentium II Processor, Intel Pentium Processor, Intel 486 Processor, AMD K6 Processor, AMD K5 Processor, AMD 486 Processor series and the like may be used as the CPU 1.

The power supply module 2 supplies a power supply voltage to various parts of the lap-top computer including the CPU 1, the system controller 3 and the clock generator 4. In order to suppress a sudden voltage drop within the CPU 1 caused by a change in a current when the frequency of the external clock ECLK suddenly changes, capacitors (not shown) described above are provided within the power supply module 2.

The system controller 3 manages the states of the entire lap-top computer, and supplies the power save instruction signal to the CPU 1 when setting the operation mode of the CPU 1 to the power save mode. In addition, the system controller 3 supplies a frequency instruction signal which instructs the frequency of the external clock ECLK to the clock generator 4, in order to make the clock generator 4 generate the external clock ECLK depending on the operation mode of the CPU 1. For the sake of convenience, it is assumed in this embodiment that the CPU 1 has, in addition to the stop mode, two operation modes, namely, a low-speed operation mode and a high speed operation mode. In the low-speed operation mode, a low-speed operation is carried out in response to the internal clock CLK having a low frequency. On the other hand, in the high-speed operation mode, a high-speed operation which is carried out at a speed higher than the low-speed operation is carried out in response to the internal clock CLK having a high frequency which is higher than the above low frequency.

Accordingly, in the low-speed operation mode, the clock generator 4 outputs a low-frequency external clock ECLK in response to the frequency instruction signal from the system controller 3. On the other hand, in the high-speed operation mode, the clock generator 4 outputs a high-frequency external clock ECLK in response to the frequency instruction signal from the system controller 3. Further, in this embodiment, when the operation mode is switched from the low-speed operation mode or the stop mode to the high-speed operation mode, the clock generator 4 gradually increases the frequency of the external clock ECLK to the high frequency within a predetermined time in response to the frequency instruction signal from the system controller 3. This predetermined time is set within a latency time that is required for the PLL circuit within the control circuit part 11 of the CPU 1 to make a phase lock by following a change in the frequency of the external clock ECLK.

Figure 2:
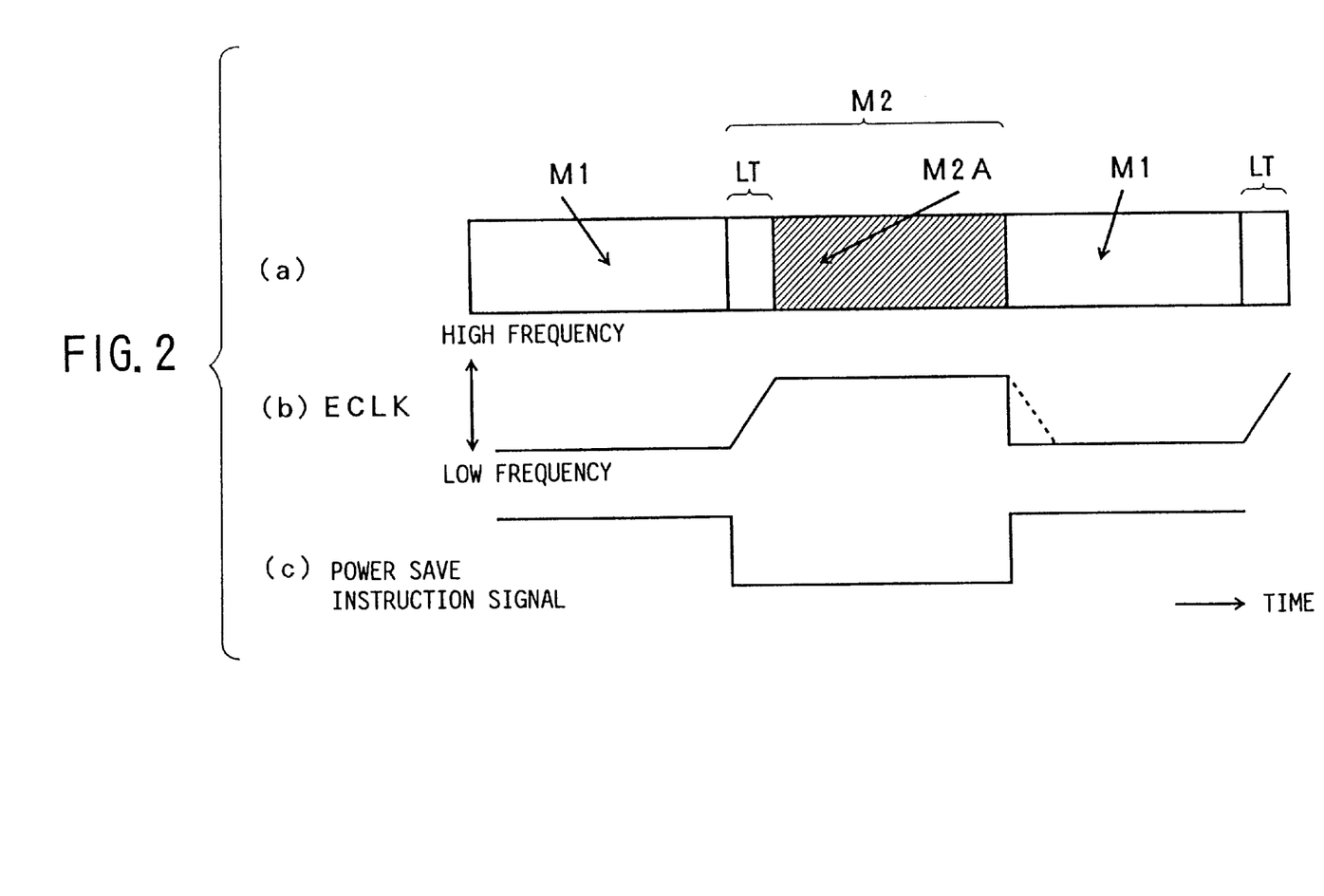
FIGS. 2(a) through 2(c) are timing charts for explaining the operation of the first embodiment.

FIGS. 2(a) through 2(c) are timing charts for explaining the operation of this embodiment. FIG. 2(a) shows the operation state of the CPU 1, FIG. 2(b) shows the external clock ECLK output from the clock generator 4, and FIG. 2(c) shows the power save instruction signal output from the system controller 3. In a low-speed operation mode (or stop mode) M1 shown in FIG. 2(a), the external clock ECLK output from the clock generator 4 in response to the frequency instruction signal from the system controller 3 has a low frequency as shown in FIG. 2(b). In addition, the system controller 3 supplies to the CPU 1 a high-level power save instruction signal which indicates the low-speed operation mode M1 as shown in FIG. 2(c).

When the operation mode of the CPU 1 is switched from the low-speed operation mode M1 to a high-speed operation mode M2, the level of the power save instruction signal supplied to the CPU 1 from the system controller 3 changes to a low level. At the same time, the clock generator 4 gradually increases the frequency of the external clock ECLK supplied to the CPU 1 in response to the frequency instruction signal from the system controller 3. The frequency of the external clock ECLK is increased up to the high frequency at the time of the high-speed operation mode M2, within a latency time LT required for the PLL circuit within the control circuit part 11 of the CPU 1 to make a phase lock by following a change in the frequency of the external clock ECLK. After the latency time LT elapses from the time when the operation mode is switched from the low-speed operation mode M1 to the high-speed operation mode M2, the CPU 1 assumes a full operation state M2A in the high-speed operation mode.

Figure 3:
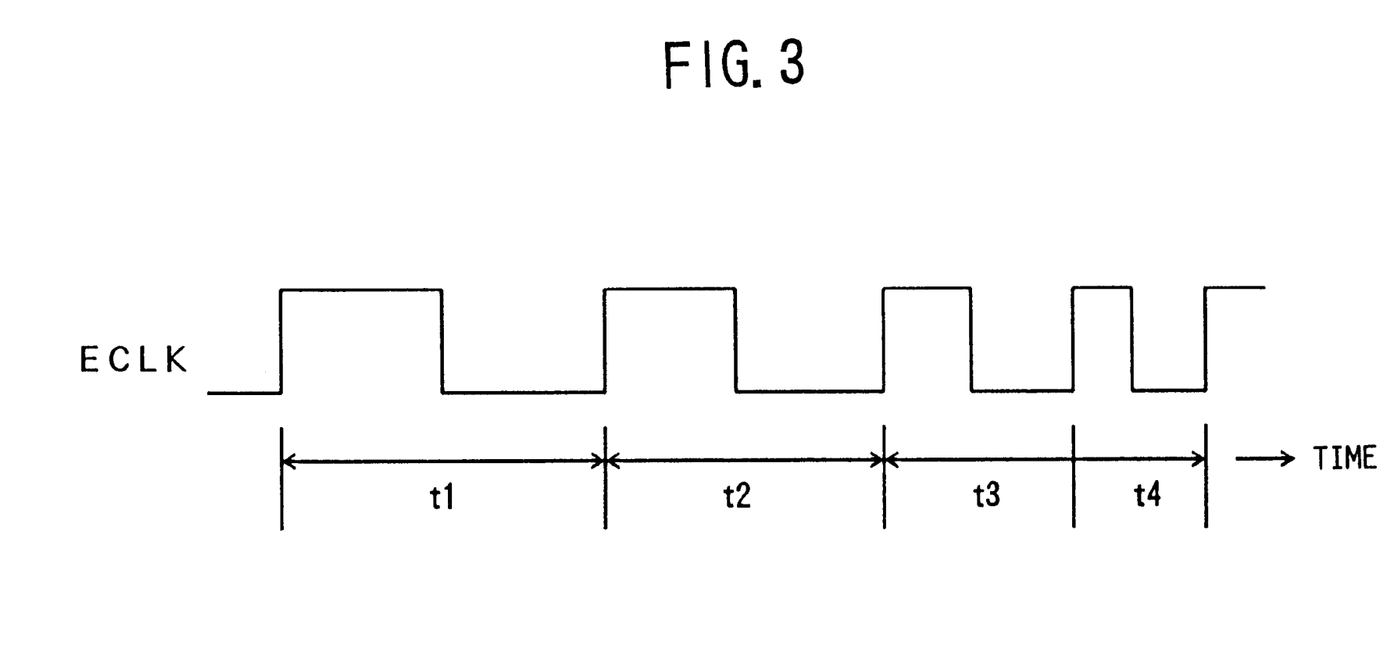
FIG. 3 is a diagram for explaining a frequency transition of an external clock.

Within this latency time LT, the frequency of the external clock ECLK gradually increases as shown in FIG. 3. In FIG. 3, t1, t2, t3, t4, . . . indicate the period of the external clock ECLK, where t1>t2>t3>t4>. . . . The frequency of the external clock ECLK may be increased continuously or in steps, within the latency time LT. In addition, the frequency of the external clock ECLK may be increased linearly or non-linearly, as long as no sudden change is introduced in the current which is supplied to the CPU 1.

Thereafter, when the operation mode of the CPU 1 is switched from the high-speed operation mode M2 to the low-speed operation mode M1, the level of the power save instruction signal supplied to the CPU 1 from the system controller 3 changes to a high level. At the same time, the clock generator 4 changes the frequency of the external clock ECLK supplied to the CPU 1 to the low frequency at the time of the low-speed operation mode M1 in response to the frequency instruction signal from the system controller 3. If the operation mode of the CPU 1 is thereafter switched again from the low-speed operation mode M1 to the high-speed operation mode M2, an operation similar to the above is carried out.

In this embodiment, when the operation mode of the CPU 1 is switched from the low-speed operation mode M1 to the high-speed operation mode M2, the frequency of the external clock ECLK supplied to the CPU 1 is gradually increased, so that the current supplied to the CPU 1 will not increase suddenly and generate a sudden voltage drop. For this reason, the capacitances of the capacitors which are provided within the power supply module 2 for the purposes of absorbing the voltage drop within the CPU 1 when the operation mode is switched may be set to relatively small values. As a result, it is possible to realize an inexpensive lap-top computer having a small size. In addition, since the frequency of the external clock ECLK is increased within the latency time LT of the PLL circuit within the CPU 1 when the operation mode of the CPU is switched from the low-speed operation mode M1 to the high-speed operation mode M2, it is possible to guarantee a stable operation in a full operation state M2A, substantially without delaying the operation of the CPU 1 to stabilize. Therefore, it is possible to simultaneously increase the operation speed of the CPU 1 and to reduce the power consumption of the CPU 1.

Next, a description will be given of a second embodiment of the information processing apparatus of the present invention. This second embodiment of the information processing apparatus employs a second embodiment of the clock supplying method according to the present invention. In this second embodiment of the information processing apparatus, the present invention is also applied to a lap-top computer.

Figure 4:
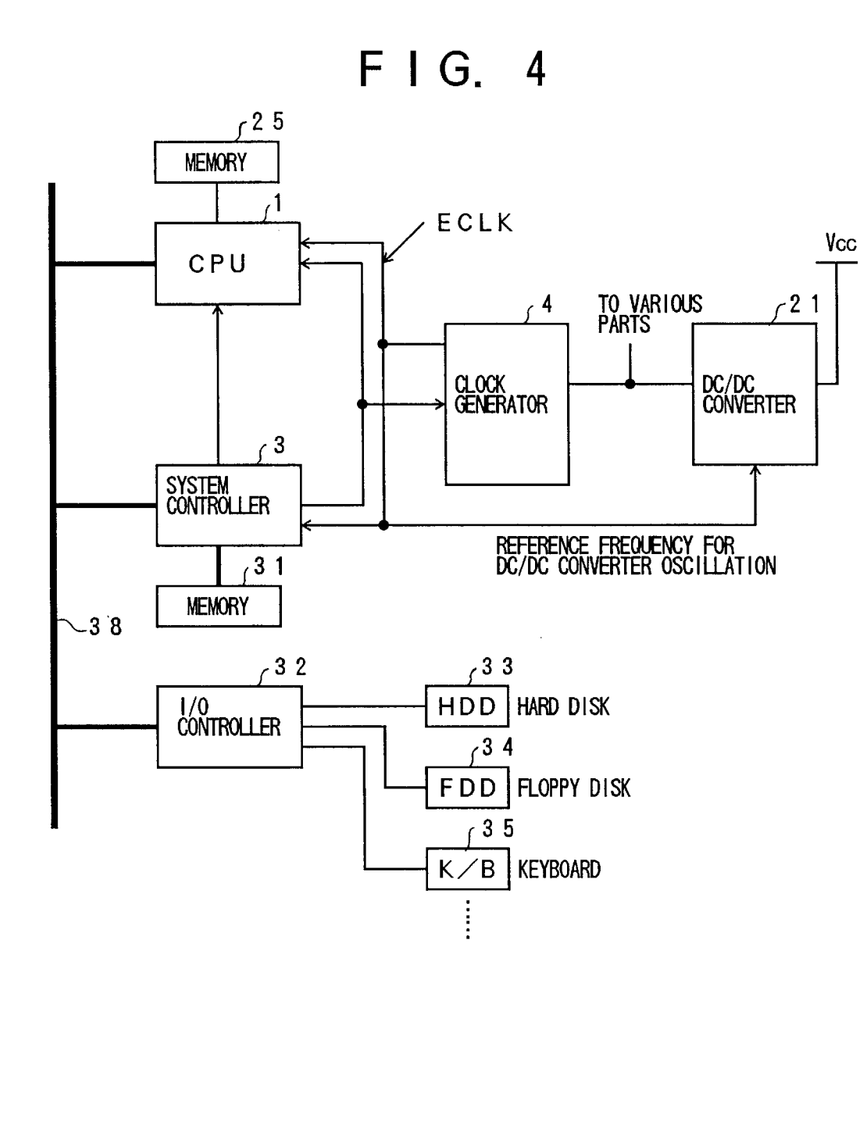
FIG. 4 is a system block diagram showing an important part of a second embodiment of the information processing apparatus according to the present invention.

FIG. 4 is a system block diagram showing an important part of the second embodiment of the information processing apparatus according to the present invention. In FIG. 4, those parts which are the same as those corresponding parts in FIG. 1 are designated by the same reference numerals, and a description thereof will be omitted. The CPU 1, the system controller 3, an input/output (I/O) controller 32 are coupled via a system bus 38. A DC/DC converter 21 is provided in place of the power supply module 2 shown in FIG. 1, and this DC/DC converter 21 supplies power supply voltages to various parts of the lap-top computer including the CPU 1, the system controller 3, the clock generator 4. For the sake of convenience, FIG. 4 only shows a power supply voltage supplying path from the DC/DC converter 21 to the clock generator 4. The DC/DC converter 21 has a known construction capable of generating a plurality of power supply voltages such as 5 V and 3 V from a voltage Vcc obtained from a power source, and the various power supply voltages generated by the DC/DC converter 21 are supplied to various parts of the lap-top computer.

The clock generator 4 supplies the external clock ECLK as a reference clock to the CPU 1, the system controller 3, the DC/DC converter 21 and the like. A memory 25 is coupled to the CPU 1, and this memory 25 stores programs to be executed by the CPU 1 and various data including intermediate data which are obtained during computations carried out by the CPU 1. Similarly, a memory 31 is coupled to the system controller 31, and this memory 31 stores programs to be executed by the system controller 3 and various data including intermediate data which are obtained during computations carried out by the system controller 3.

The I/O controller 32 controls input and output devices which are coupled to the CPU 1, under the control of the CPU 1 and the system controller 3. In this embodiment, a hard disk drive (HDD) 33, a floppy disk drive (FDD) 34 and a keyboard (K/B) 35 are coupled to the I/O controller 32 as the input and output devices, but the input and output devices are of course not limited to such. In addition, it is also possible to couple external input and output devices to the I/O controller 32, and the HDD 33 and/or the FDD 34 may be the external input and output devices.

When the load on the CPU 1 is small, the system controller 3 sets the operation mode of the CPU 1 to the low-speed operation mode M1. More particularly, the system controller 3 supplies a high-level power save instruction signal to the CPU 1. On the other hand, when the load on the CPU 1 is large, the system controller 3 sets the operation mode of the CPU 1 to the high-speed operation mode M2. More particularly, the system controller 3 supplies a low-level power save instruction signal to the CPU 1.

When the operation mode of the CPU 1 is switched from the low-speed operation mode M1 to the high-speed operation mode M2, the system controller 3 supplies to the clock generator 4 a frequency instruction signal for increasing the frequency of the external clock ECLK, and similarly as in the case of the first embodiment described above in conjunction with FIGS. 2(a) through 2(c), the frequency of the external clock ECLK increases within the latency time LT of the PLL circuit within the CPU 1. On the other hand, when the operation mode of the CPU 1 is switched from the high-speed operation mode M2 to the low-speed operation mode M1, the system controller 3 supplies to the clock generator 4 a frequency instruction signal for decreasing the frequency of the external clock ECLK, and the frequency of the external clock ECLK gradually decreases as indicated by a dotted line in FIG. 2(b). Accordingly, this embodiment takes measures so that no sudden change occurs in the current flowing within the CPU 1 even when the operation mode of the CPU 1 is switched from the high-speed operation mode M2 to the low-speed operation mode M1, thereby positively preventing an erroneous operation of the CPU 1.

As will be described later, the frequency instruction signal output from the system controller 3 is also supplied to the PLL circuit within the CPU 1, so as to determine the frequency of the internal clock CLK within the CPU 1.

Figure 5:
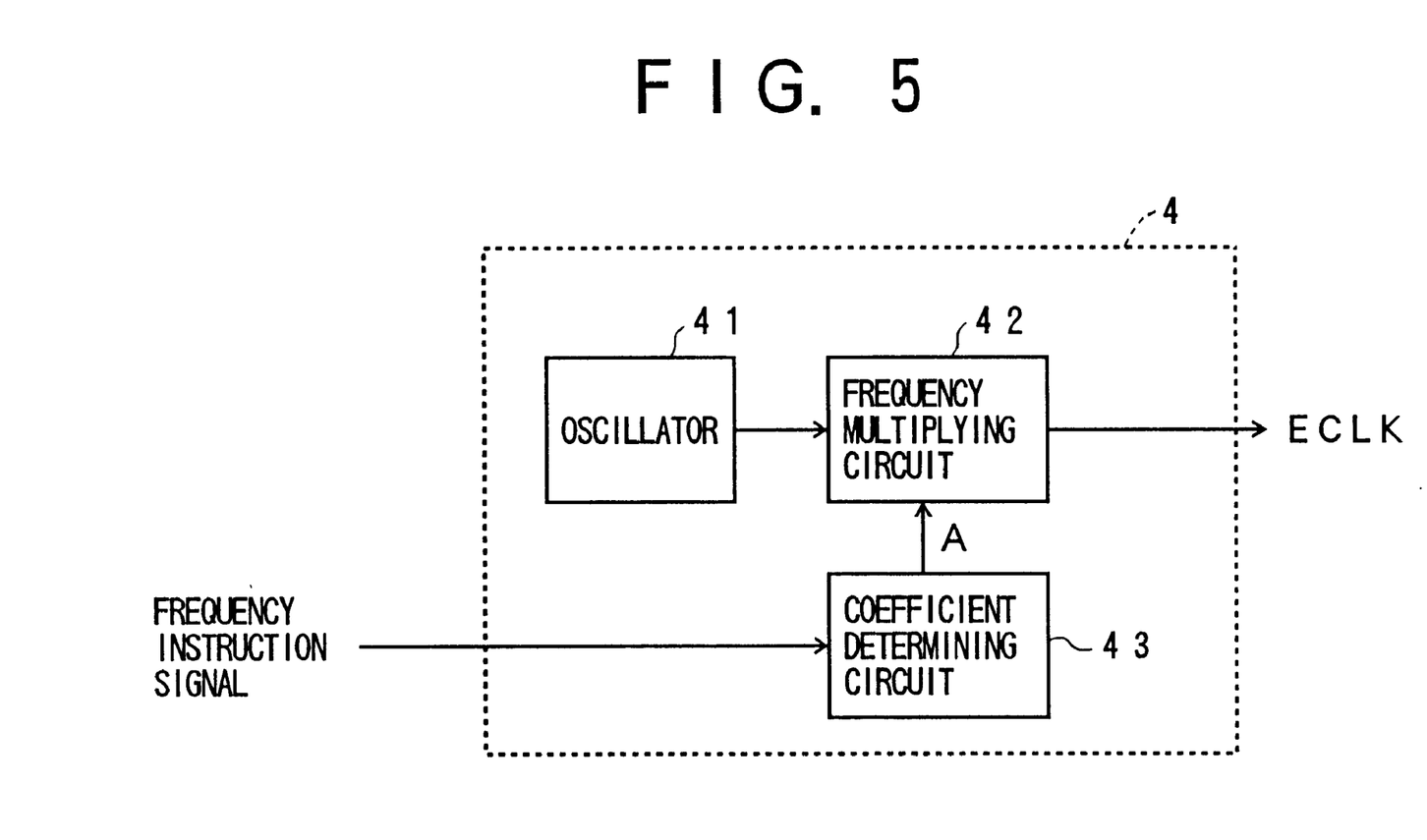
FIG. 5 is a system block diagram showing an embodiment of a clock generator.

FIG. 5 is a system block diagram showing an embodiment of the clock generator 4 of the second embodiment. The clock generator 4 includes an oscillator 41, a frequency multiplying circuit 42, and a coefficient determining circuit 43 which are coupled as shown in FIG. 5. The oscillator 41 supplies a signal having a constant frequency to the frequency multiplying circuit 42, and the frequency multiplying circuit 42 multiplies a coefficient A supplied from the coefficient determining circuit 43 to the frequency of the signal obtained from the oscillator 41. The external clock ECLK is output from the frequency multiplying circuit 42.

The coefficient determining circuit 43 determines the coefficient A in response to the frequency instruction signal from the system controller 3. For example, the coefficient determining circuit 43 is made up of a read only memory (ROM) table which stores a first function for increasing the coefficient A and a second function for decreasing the coefficient A. Accordingly, when the frequency instruction signal indicates the switching of the operation mode from the low-speed operation mode M1 to the high-speed operation mode M2, the first function is read from the ROM table, and the value of the coefficient A supplied to the frequency multiplying circuit 42 increases based on the first function, thereby gradually increasing the frequency of the external clock ECLK output from the frequency multiplying circuit 42. On the other hand, when the frequency instruction signal indicates the switching of the operation mode from the high-speed operation mode M2 to the low-speed operation mode M1, the second function is read from the ROM table, and the value of the coefficient A supplied to the frequency multiplying circuit 42 decreases based on the second function, thereby gradually decreasing the frequency of the external clock ECLK output from the frequency multiplying circuit 42.

The first and second functions described above may continuously change the coefficient A or, change the coefficient A in steps. Furthermore, the first and second functions may be linear functions for linearly changing the coefficient A or, non-linear functions for non-linearly changing the coefficient A.

Figure 6:
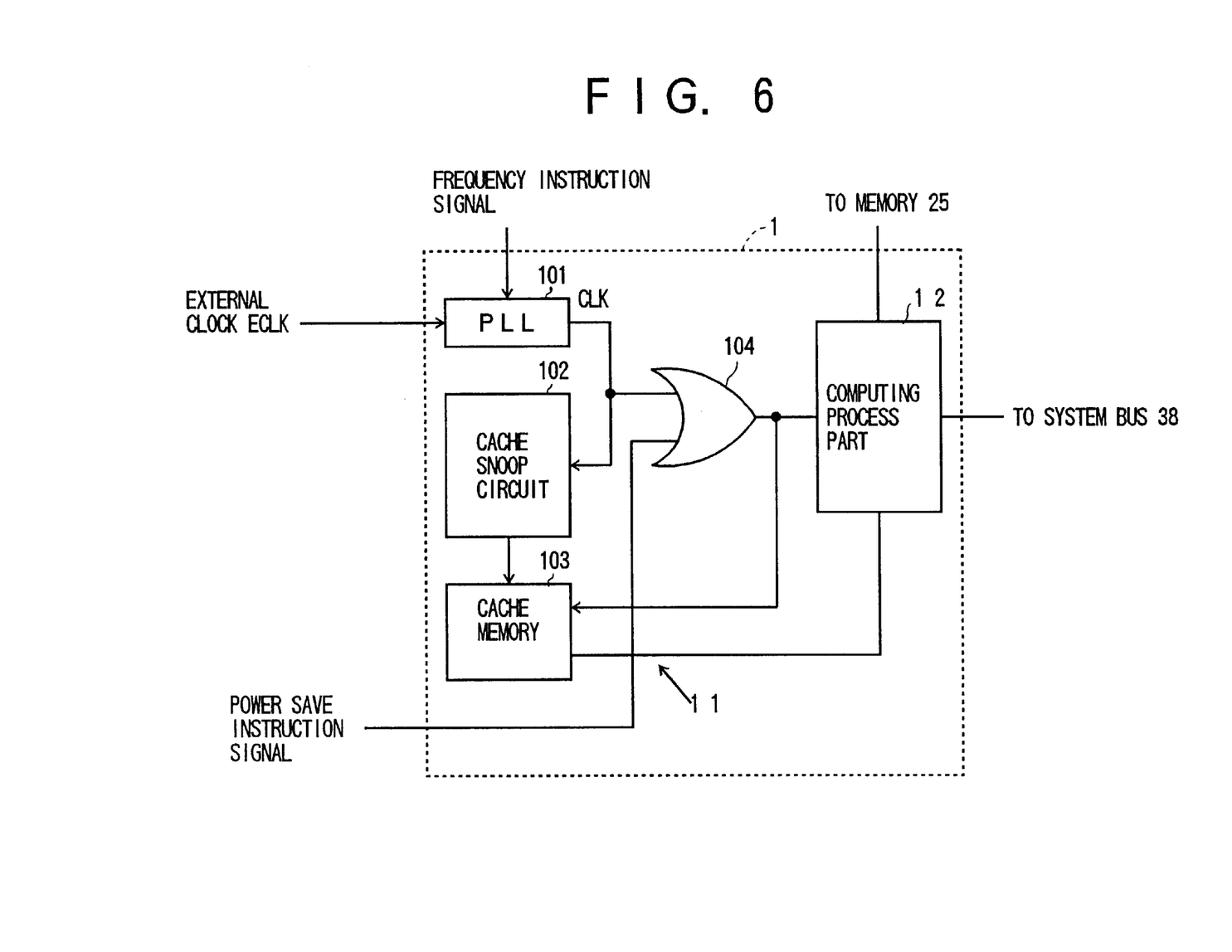
FIG. 6 is a system block diagram showing an embodiment of a CPU.

FIG. 6 is a system block diagram showing an important part of the internal structure of the CPU 1. In FIG. 6, the CPU 1 generally includes the control circuit part 11 and the computing process part 12, and the control circuit part 11 includes a PLL circuit 101, a cache snoop circuit 102, a cache memory 103 and a gate circuit 104.

Figure 7:
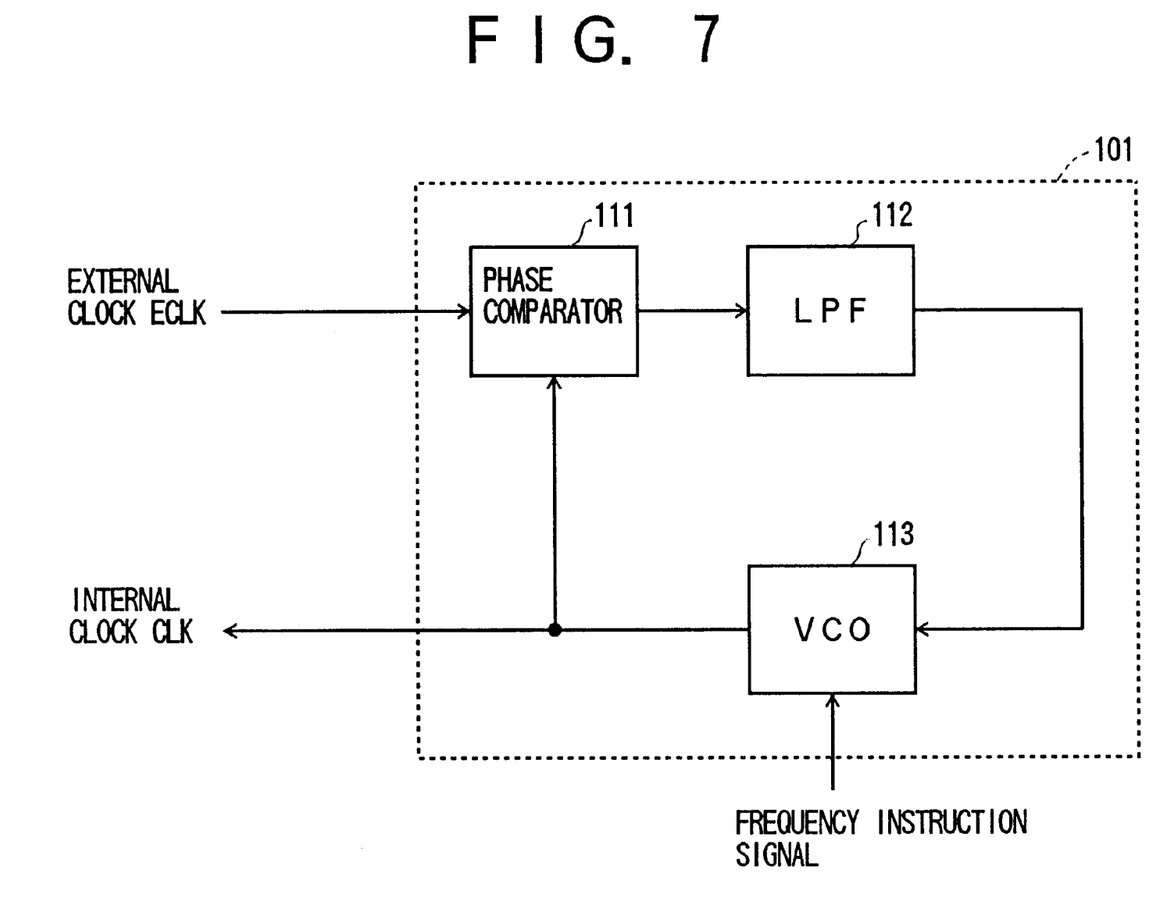
FIG. 7 is a system block diagram showing an embodiment of a PLL circuit.

FIG. 7 is a system block diagram showing the internal structure of the PLL circuit 101. In FIG. 7, the PLL circuit 101 includes a phase comparator 111, a lowpass filter (LPF) 112, and a voltage controlled oscillator (VCO) 113. The external clock ECLK obtained from the clock generator 4 is input to the phase comparator 111 and compared with an output signal of the VCO 113. An output signal of the phase comparator 111 is supplied to the VCO 113 via the LPF 112, and an oscillation frequency of the VCO 113 is controlled based on the frequency instruction signal obtained from the system controller 3. Normally, an output signal frequency of the VCO 113 is controlled based on the frequency instruction signal so as to become higher than an input signal frequency of the VCO 113. The output signal of the VCO 113 is supplied to the computing process part 12 of the CPU 1 via the gate circuit 104, as the internal clock CLK. In other words, the frequency of the internal clock CLK is higher than the frequency of the external clock ECLK.

In FIG. 6, the internal clock CLK output from the PLL circuit 101 is supplied to the gate circuit 104 and the cache snoop circuit 102. The cache snoop circuit 102 is coupled to the cache memory 103, and realizes a snoop function of the cache memory 103 by supplying an address or the like to the cache memory 103. The cache memory 103 is coupled to the computing process part 12, and realizes a data cache function in synchronism with the internal clock CLK which is obtained via the gate circuit 104.

The gate circuit 104 is made up of an OR gate. This gate circuit 104 blocks the internal clock CLK from the PLL circuit 101 during a high-level period of the power save instruction signal from the system controller 3, and supplies the internal clock CLK to the computing process part 12 and the cache memory 103 only during a low-level period of the power save instruction signal. As a result, in the power save mode of the CPU 1, only a portion of the control circuit part 11 operates, and the power consumption is suppressed to a low value.

In each of the embodiments described above, the present invention is applied to the lap-top computer. However, it is possible to obtain effects similar to those obtainable in the above described embodiments when the present invention is applied to various types of portable information processing apparatuses such as portable terminal equipments, and to various types of information processing apparatuses such as personal computers.

Further, the present invention is not limited to these embodiments, but various variations and modifications may be made without departing from the scope of the present invention.

What is claimed is:

1. A method of modifying a clock of a processing unit, the processing unit having a phase locked loop circuit which outputs the processing unit clock based on a frequency of an input signal, the method comprising:

generating a clock signal external to the processing unit;

providing the external input clock signal to the phase locked loop as the input signal; and gradually increasing a frequency of the external clock from a first frequency to a second frequency within a latency time required for the phase locked loop circuit to make a phase lock, when an operation mode of the processing unit is switched from a first mode to a second mode.

2. The clock modifying method as claimed in claim 1, wherein the first mode is a power save mode of the processing unit.

3. The clock modifying method as claimed in claim 2, wherein an internal clock of the processing unit is stopped in the power save mode.

4. The clock modifying method as claimed in claim 3, further comprising:
gradually decreasing the frequency of the external clock, when the operation mode of the processing unit is switched from the second mode to the first mode.

5. The clock modifying method as claimed in claim 2, further comprising:
gradually decreasing the frequency of the external clock from the second frequency to the first frequency, when the operation mode of the processing unit is switched from the second mode to the first mode.

6. The clock modifying method as claimed in claim 1, further comprising:
gradually decreasing the frequency of the external clock to be supplied to the processing unit from the second frequency to the first frequency, when the operation mode of the processing unit is switched from the second mode to the first mode.

7. An information processing apparatus comprising:
a clock generator having a variable oscillation frequency and generating an external clock;
and a processing unit having a phase lock loop and supplied with an external clock,
said clock generator gradually increasing a frequency of the external clock from a first frequency to a second frequency within a latency time required for the phase locked loop circuit to make a phase lock, when an operation mode of the processing unit is switched from a first mode to a second mode in response to a mode instruction signal.

8. The information processing apparatus as claimed in claim 7, wherein the first mode is a power save mode of the processing unit.

9. The information processing apparatus as claimed in claim 8, wherein an internal clock of the processing unit is stopped in the power save mode.

10. The information processing system as claimed in claim 9, wherein said clock generator gradually decreases the frequency of the external clock to be supplied to the processing unit from the second frequency to the first frequency, when the operation mode of the processing unit is switched from the second mode to the first mode in response to the mode instruction signal.

11. The information processing system as claimed in claim 8, wherein said clock generator gradually decreases the frequency of the external clock to be supplied to the processing unit from the second frequency to the first frequency, when the operation mode of the processing unit is switched from the second mode to the first mode in response to the mode instruction signal.

12. The information processing system as claimed in claim 7, wherein said clock generator gradually decreases the frequency of the external clock to be supplied to the processing unit from the second frequency to the first frequency, when the operation mode of the processing unit is switched from the second mode to the first mode in response to the mode instruction signal.

13. An information processing apparatus comprising:
a processing unit having an internal phase locked loop, said phase locked loop having an output which provides a clock signal based on a reference signal, said reference signal being lower in frequency than a frequency of said clock signal;
a variable frequency signal generator, external of said processing unit, which generator provides the reference signal, said signal generator varying the frequency of the reference signal between a first frequency and a second frequency in response to a comnmand signal and at a rate of variation which permits the phase locked loop to maintain a phase lock.

14. An information processing apparatus as claimed in claim 13, wherein said reference frequency is varied in steps.

15. An information processing apparatus as claimed in claim 13, wherein said reference frequency is varied continuously.

16. A method of modifying a clock of a processing unit, the processing unit having a phase locked loop circuit which outputs the processing unit clock based on a frequency of an input signal, the method comprising:
generating a clock signal external to the processing unit;
providing the external clock signal to the phase locked loop as the input signal; and
gradually decreasing a frequency of the external clock signal from a first frequency to a second frequency within a latency time required for the phase locked loop circuit to make a phase lock, when an operation mode of the processing unit is switched from a first mode to a second mode.

* * * * *